May 14, 1957 W. L. WHEELER 2,792,192
AIRCRAFT FUEL PUMP AND TANK ARRANGEMENT
Filed Oct. 20, 1953
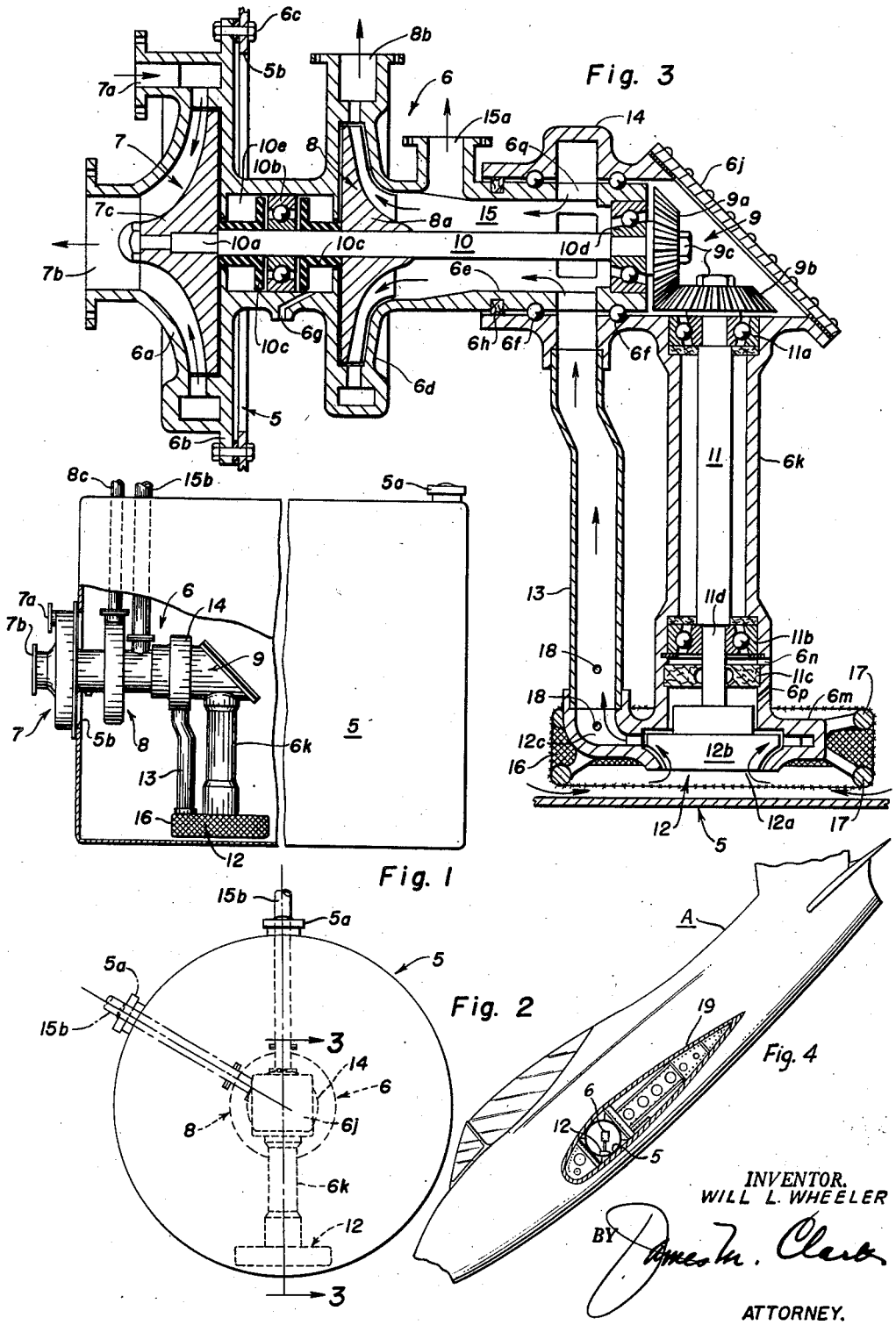
INVENTOR.
WILL L. WHEELER
BY
ATTORNEY.

United States Patent Office 2,792,192
Patented May 14, 1957

2,792,192

AIRCRAFT FUEL PUMP AND TANK ARRANGEMENT

Will L. Wheeler, Worthington, Ohio, assignor to North American Aviation, Inc.

Application October 20, 1953, Serial No. 387,263

14 Claims. (Cl. 244—135)

The present arrangement relates generally to pump and tank arrangements and more particularly to improvements in the mounting of submerged swivelling pumps within storage tanks.

In the mounting of pumps within tanks, particularly those in aircraft and other vehicles which are subject to appreciable variation in flight attitudes, it is frequently desirable that the submerged pump be automatically maintained at all times at the bottom of the tank, or within the stored liquid. Numerous arrangements have heretofore been proposed and used, particularly in connection with aircraft fuel and oil tanks and the present invention is directed to an improved arrangement which overcomes many of the objections and shortcomings of prior installations as well as to provide advantages not heretofore obtained.

An improved form of the present invention is directed primarily to an aircraft pumping arrangement which includes a low pressure pump mounted within a tank and driven by an air turbine unit supported upon a wall of the tank. The arrangement includes the primary or low pressure pump driven from the air turbine through a set of bevel gears, the primary pump discharging upwardly into a manifold formed by the supporting housing from which the liquid is taken by a secondary high pressure pump whereby fluids at both low and high pressures are available from the installation. The low pressure primary pump is pivotally mounted in a swivel arrangement upon the air turbine drive shaft housing and is suitably weighted to be submerged within the liquid in the tank bottom at all times. The improved assembly may be additionally provided with fluid discharge jets to create counter-torque against the tendency of the rotating unit to rise from the depending position.

It is, accordingly, a major object of the present invention to provide an improved pumping arrangement for storage tanks subjected to changes in attitude during use and in which the primary pump means is at all times maintained submerged within the liquid. It is a further object to provide an improved submerged type pump for aircraft fuel and oil tanks in which the primary pumping unit is gravity-actuated to maintained the same in a submerged condition in all attitudes of the aircraft. A further object resides in the provision of an air turbine driven pump installation in which a single assembly unit is capable of delivering fluids at both high and low pressures. It is also an object to provide such an installation which is particularly suited for pumping fuel to both the main engine fuel system and the after-burner fuel system of a jet engine power plant installation. Still further objects of the present invention reside in the improved swivel mounting of the primary pump unit, the means by which it is maintained below the fluid level in the tank and its provision for overcoming disturbing torque due to the rotation of the driving mechanism. Further objects and advantages reside in the improved mounting of the unit, its housing or casing and the provision for the lubrication and cooling of the rotating elements by means of the fluid which is handled by the pumps.

Other objects and advantages of the present invention will occur to those skilled in the art after reading the following description, taken in conjunction with the accompanying drawings, forming a part hereof, in which:

Fig. 1 is an elevational view of a liquid storage tank partially broken away to show a preferred form of the improved pumping arrangement;

Fig. 2 shows an end elevation of the tank and pumping arrangement of Fig. 1.

Fig. 3 shows an enlarged cross-sectional detail of the improved pumping assembly unit; and Fig. 4 is a partial elevational view of an aircraft with the tank structure of the present invention incorporated therein, the wing having been shown in section.

With reference first to Fig. 4, there is shown an aircraft A provided with a wing 19 within which a substantially cylindrical tank 5 may be suitably supported; however, it will be appreciated that the present invention may be employed in connection with tanks located other than in the aircraft wing. The tank 5 preferably has a circular or curved cross-section, which may however be for a portion of the tank only, and is provided with a conventional filler cap 5a. One of the ends of the tank 5 may be provided with an opening 5b within which is mounted the housing or casing assembly 6 for the pumping unit. The latter is comprised of a plurality of individual units including an air turbine 7, a secondary high pressure pump 8, and the gear transmission 9 transmitting power from the horizontal drive shaft 10 to the vertical shaft 11 on which is mounted the primary, or initial booster pump 12. These are housed and supported within the housing assembly 6 which is supported from the gear turbine housing 6a and its flange 6b by the bolts 6c adjacent the edge of the tank opening 5b. The axis of the drive shaft 10 is normally horizontally disposed and preferably passes through the center of the circular or curved cross-section of the tank, which may also be of spheroidal shape. The housing assembly 6 additionally includes the high pressure pump housing 6d, and the trunnion or swivel support portion 6e which forms the inner fixed support for the anti-friction bearing 6f. Between the air turbine housing 6a and the high pressure pump housing 6d, the housing assembly 6 is provided with an air seal 10e, and a seal drain 6g adjacent the seal 10c; and a rotary seal 6h is provided upon the trunnion support 6e and in engagement with the rotary portion of the assembly 6 which includes the gear case cover 6j, the vertical shaft housing 6k, the primary pump housing 6m, the discharge conduit 13 and the annular manifold 14.

The air turbine 7 is comprised of an inlet 7a, an outlet 7b and an impeller 7c which is fixedly attached to a reduced diameter end 10a of the horizontal drive shaft 10. The opposite end of the drive shaft 10 has fixedly mounted thereon the bevel pinion 9a by means of the retaining nut 9c and the shaft 10 is journalled within the anti-friction bearings 10b and 10d within the fixed portion of the casing 6. On each side of the bearing 10b, there are provided the fluid seals 10c to prevent leakage of the fluid from the high pressure pump unit 8 to the air turbine 7 and any liquid flowing past the inner seal is drained through the pump seal drain 6g. The high pressure pump 8 comprises an impeller unit 8a, a discharge or outlet 8b and its impeller is fixedly mounted upon the horizontal drive shaft 10. The power from this shaft is transmitted from the horizontal to the vertical direction by engagement of the bevel pinion 9a with the bevel pinion 9b secured to the reduced diameter upper end of the vertical shaft 11 by the retaining nut 9c. The lower end of the vertical shaft 11 also has a reduced diameter portion 11d to which is attached the primary pump impeller 12b. The upper end of the shaft 11 is journalled in the bearing 11a supported within the shaft housing 6k, and the lower end of the shaft is journalled within the bearing 11b similarly supported in the housing 6k. It is adjacently provided with the seal 11c above which is disposed the bleed hole 6n and beneath which is provided the vapor outlet 6p which ventilates the pump impeller chamber to the fluid in the bottom of the tank.

The primary pump casing 6m has attached thereto the screen or strainer structure 16 and may preferably be provided with suitable weights 17 to cause the swivelling or swingable portion of the assembly to maintain its vertical position suspended below the axis of the normally horizontal shaft 10. The primary pump unit 12 is provided with an inlet 12a facing downwardly toward and in proximity to, the bottom of the tank 5, being formed by an opening in the pump casing 6m within which the impeller 12b is rotatable and discharges through the pump outlet 12c. The fluid discharged by the primary pump 12 continues upwardly vertically within the pipe or conduit 13 and into the annular manifold 14 from which it flows through the holes 6q into the chamber 15. The fluid is maintained within this chamber in an appreciable volume determined by the capacity of the chamber and at the lower pressure developed by the primary pump 12. Fuid at this lower pressure is carried from the chamber 15 through its outlet 15a and the pipe 15b to those instrumentalities requiring the fluid at this lower pressure. For those instrumentalities which require the same fluid at a substantially higher pressure, the low pressure fluid is drawn from the chamber 15 by the high pressure reheat pump 8 by its impeller 8a fixed to and rotatable with the horizontal shaft 10, and the fluid at a substantially higher pressure is discharged upwardly through the outlet 8b and by means of the pipe or conduit 8c to the instrumentality requiring fluid at this higher pressure. The pump arrangement disclosed is particularly adapted for use with a jet turbine power plant provided with an after-burner in which main engine fuel at approximately 25 p. s. i. g. is provided for the main engine through the outlet 15a and the pipe 15b, and fuel at approximately 500 p. s. i. g. is provided through the outlet 8b and the pipe 8c to the after-burner unit of the power plant.

It will accordingly be noted that regardless of the tilted attitude of the tank 5, as may be determined by maneuvers in flight of the aircraft in which it is carried, the primary pump unit 12, together with the other freely swivelling portions of the installation, will rotate about the axis of the shaft 10 to that lower portion of the tank in which the fuel will also accumulate as determined by the same maneuver of the aircraft. For example, in Fig. 2, the full line showings of the filler cap 5a and the low pressure fuel outlet 15b is shown in full lines in the normal position at the top of the tank whereas if the airplane were maneuvered such that the top of the tank and the filler cap 5a and the supply pipe 15b were rotated to the position shown in construction lines in Fig. 2, the swivelling portion of the insallation would remain in its position suspended vertically beneath the axis of the shaft 10, about which it is freely swivellable.

Due to the torque applied to the bevel pinion 9b by the drive pinion 9a there is a tendency of the swivelling assembly to rotate about the axis of the shaft 10, but this is opposed and substantially minimized by addition of the weights 17 to the primary pump casing 6m adjacent the strainer 16. This tendency to rotate due to the applied driving torque may also be minimized and substantially eliminated by the provision of the counter-torque jet orifices 18 provided through the pump discharge casing 12c and the lower portion of the discharge conduit 13 in such manner that the reaction of the fluid flowing through these jets with the fluid in the tank tends to oppose the rotation of the freely swivelling portion of the assembly. This counter-torque feature of the device is automatic in its operation inasmuch as it functions only when the primary pump 12 is driven, and then its counter-acting effect is increased automatically as the pump 12 is driven faster and the pressure of the fluid which it discharges is also increased.

It will also be noted that the disclosed arrangement utilizes the fluid which is being handled to both lubricate and cool the friction producing portions of the installation. In this connection, the fluid which is drawn in from the bottom of the tank 5 through the primary pump inlet 12a and discharged through the conduit 13 into the annular manifold 14 and the chamber 15 is utilized for the lubrication and cooling of the bearing 10d through which it flows into the gear case housing 6j and from whence it also flows to lubricate and cool the spindle or trunnion bearings 6f, as well as the vertical bearings 11a and 11b for the vertical shaft 11. The initial bearing 10b for the shaft 10 adjacent the air driven turbine 7 may preferably be lubricated by conventional means inasmuch as this bearing is accessible from the exterior of the tank 5 adjacent the opening 5b and an air seal is provided by the rubber seal unit between the turbine and the first bearing.

Thse disclosed arrangement provides a relatively compact installation in which two pump units are driven by the same air turbine for simultaneous delivery of boiling fuel or other fluid at different pressures. The entire assembly is also supported in a sealed and fluid-tight arrangement at one supporting plane upon the end of the tank 5 adjacent the opening 5b therein. It will also be understood that for purposes of clarification, and to facilitate the explanation of the present improvement, the casing and construction of the air turbine and pumps shown in Fig. 3 have been disclosed diagrammatically and schematically and that the casing would preferably be provided with separating flanged portions suitably bolted together to facilitate the assembly of the several units and their disassembly for inspection and servicing purposes.

Other forms and modifications of the present invention both with respect to its general arrangement and the details of its several parts, which may occur to those skilled in the art after reading the foregoing description, are intended to come within the scope and spirit of the present invention as more particularly set forth in the following claims.

I claim:

1. An aircraft, a liquid storage tank fixedly supported upon said aircraft and tiltable into a plurality of positions as said aircraft is manuevered, a support assembly fixedly attached to said tank, said fixed support assembly mounted upon a wall of said tank and having a longitudinal axis extending into said tank, said fixed support assembly having a bearing portion formed adjacent its inner terminal, a rotatable support assembly rotatably mounted upon the bearing portion of said fixed support assembly, a primary pump housed within the depending portion of said movable support assembly having its inlet open to the adjacent bottom of said tank irrespective of the position of said aircraft, power transmission means rotatably journalled within both said fixed support assembly and said rotatable support assembly, means for applying power to said transmission means, and conduit means including a rotatable manifold in communication with a chamber formed within said fixed support assembly for transmitting fluid discharged by said primary pump from the interior of said tank to a fixed conduit extending through a wall of said tank.

2. An aircraft, a liquid storage tank fixedly supported upon said aircraft and tiltable into a plurality of positions as said aircraft is maneuvered, a support assembly fixedly attached to said tank, said fixed support assembly mounted upon a wall of said tank and having a longitudinal axis and an inner terminal portion extending through said tank wall to a central portion internally of said tank, said fixed support assembly having a bearing portion formed adjacent said inner terminal portion, a rotatable support assembly rotatably mounted upon the bearing portion of said fixed support assembly, a primary pump housed within the depending portion of said movable support assembly having its inlet open to the adjacent bottom of said tank irrespective of the position of said aircraft, power transmission means including gearing rotatably journalled within both said fixed support assembly and said rotatable support assembly, means for applying power to said transmission means, conduit means including a rotatable manifold carried by said rotatable support assembly in communication with a chamber formed within said fixed support assembly for transmitting fluid discharged by said primary pump from the interior of said tank in all of its tilted positions to a fixed conduit extending through a wall of said tank, and means including liquid jet orifices formed in said conduit means for opposing torque developed by said power transmission means.

3. An aircraft, a liquid storage tank fixedly supported upon said aircraft and tiltable into a plurality of positions as said aircraft is maneuvered, a support assembly fixedly attached to said tank, said fixed supported assembly supported from a wall of said tank and having a longitudinal axis extending inwardly through said tank wall to a central portion internally of said tank, said fixed support assembly having a bearing portion formed adjacent its inner terminal, a rotatable support assembly rotatably mounted upon the bearing portion of the inner terminal of said fixed support assembly, a primary pump housed within the depending portion of said movable support assembly having an inlet open to the adjacent bottom of said tank in each of its tilted positions, power transmission means including a bevel gear set rotatably journalled within both said fixed support assembly and said rotatable support assembly, means for applying power to said transmission means, a secondary pump housed within said fixed support means, and conduit means including a rotatable manifold in communication with a chamber formed within said fixed support assembly for transmitting fluid discharged by said primary pump from the interior of said tank both to said secondary pump and to a fixed conduit extending through a wall of said tank.

4. The combination with a liquid storage tank, a pumping assembly comprising a fixed casing member supported from said tank, power driving means rotatably supported by said fixed casing member, a submersible pump unit rotationally journalled upon said fixed casing member such that said pump unit is suspendingly disposed within said storage tank, said submersible pump unit provided with transmission means in rotational engagement with said drive means of said fixed assembly whereby said submersible pump unit is continuously driven through said transmission means and maintained submerged within the liquid in said tank in a plurality of positions into which said tank may be tilted, and means initiated by the operation of said pump for opposing transmission torque forces tending to disturb said freely suspended position of said pump at the bottom of said tank.

5. A liquid storage tank, a pumping installation comprising a casing member supported from said tank, power driving means rotatably supported from said casing member, a submersible pump assembly rotationally journalled upon said casing member such that said pump unit is suspendingly disposed within said storage tank, said submersible pump assembly provided with transmission means in rotational engagement with said drive means of said fixed assembly whereby said submersible pump assembly may be suspended continuously in the liquid in the region of the bottom of the tank in a plurality of positions suspended from said fixed casing member into which said tank may be tilted, and countertorque means influenced by the discharge of said pump assembly for opposing torque developed by the said drive and transmission means tending to move said assembly from said suspended position at the bottom of said tank.

6. In a tank subject to being disposed in a plurality of different attitudes, a first support member fixedly attached to a side of said tank along a normally horizontal axis, said fixed support member having a bearing portion with a horizontal axis disposed within said tank, a movable support member rotatably mounted upon said bearing portion of said fixed support member for suspension in a vertical disposition below said horizontal axis toward the bottom of said tank, pump means rotatable upon a vertical axis carried by the free end of said movable support member in a position adjacent the bottom of said tank irrespective of the attitude of said tank, and transmission means including meshing bevel gears for transmitting power from the horizontal axis of said fixed support member to the vertical axis of said pump means irrespective of said tank attitude.

7. A tank subject to being tilted into a plurality of different positions, a first support member fixedly attached to said tank along a normally horizontal axis, said fixed support member having a bearing portion disposed within said tank, a movable support member rotatably mounted upon said bearing portion of said fixed support member for its free suspension therefrom, a rotary pump carried by the free end of said movable support member, such that said rotary pump is suspendingly disposed within said tank adjacent the bottom thereof, a source of power, and transmission means journalled within said fixed and movable support members for transmitting power from said power source to said rotary pump in its freely suspended position for drawing liquid from the bottom of said tank at any of the positions into which said tank may be tilted.

8. An aircraft, a tank carried by said aircraft subject to being tilted into a plurality of positions in accordance with the maneuvers of said aircraft, a first support member fixedly attached to a side of said tank along a normally horizontal axis, said fixed support member having a bearing portion, a movable support rotatably mounted upon said bearing portion of said fixed support member for its free suspension therefrom within said tank, a rotary pump carried by the free end of said movable support member such that said rotary pump is suspendingly disposed within said tank adjacent the bottom thereof, transmission means journalled within said fixed and movable support members for transmitting power to said rotary pump for drawing liquid from the bottom of said tank at any of the positions into which said tank may be tilted by maneuvers of said aircraft, and means initiated by the operation of said pump for opposing transmission torque forces tending to disturb said freely suspended position of said pump at the bottom of said tank.

9. The combination with a liquid storage tank subject to being tilted into a plurality of positions and a pumping assembly including a fixed support member having a normal horizontal axis supported from said tank, a movable support member rotatably mounted upon said fixed support member for its free suspension therefrom into vertical positions irrespective of the tilted position of said tank, and power driving means rotatably supported by both said fixed support member and said movable support member, of a submersible pump unit rotationally journalled upon said movable support member such that said pump unit is suspendably disposed within said storage tank at the free end of said movable support member, said submersible pump unit provided with transmission means journalled within said fixed support member and within said movable support member and in rotational engagement with said power drive means whereby said submersible pump unit may be continuously driven and maintained suspended from said fixed support member upon said movable support member submerged within the liquid at the bottom of said storage tank irrespective of the tilted position of said tank.

10. In a tank installation adapted for use with aircraft subject to varying attitudes in flight, a liquid supply tank carried by the aircraft, a fixed tubular support member attached to said tank and having a journal portion disposed within said tank, said journal portion having a normally horizontal axis, a normally vertical member rotatably mounted at one end upon said journal portion of said fixed support member such that the opposite end of said rotatable member is at all times disposed within the lower portion of said tank irrespective of said varying flight attitude, primary pump means operatively associated with said opposite end of the rotatable member, means including a shaft journalled upon said horizontal axis within said fixed tubular support member for transmitting power from a source external of said tank to said primary pump means, and secondary pump means rotatably mounted upon said shaft arranged to be supplied with fluid from said primary pump means.

11. A tank installation of the type called for by claim 10 characterized by said fixed tubular support member forming a conduit for the flow of liquid from the discharge of said primary pump means to said secondary pump means.

12. A tank installation of the type called for by claim 10 characterized by the inclusion of a rotatable manifold cooperatively formed by said fixed tubular support member and said rotatably mounted member arranged to form a passage for the flow of liquid from the discharge of said primary pump means to said secondary pump means.

13. A tank installation of the type called for by claim 10 characterized by said fixed tubular support member forming a conduit for the flow of liquid from the discharge of said primary pump means to said secondary pump means and an outlet formed in said fixed tubular support member intermediate said primary pump means and said secondary pump means in such manner that fluid at different pressures may be delivered by each said pump means.

14. A tank installation of the type called for by claim 10 characterized by the inclusion of a rotatable manifold cooperatively formed by said fixed tubular support member and said rotatably mounted member, said fixed tubular support member forming a conduit for the flow of liquid from the discharge of said primary pump means through said rotatable manifold and said conduit to said secondary pump means, and an outlet formed by said tubular support member intermediate said rotatable manifold and said secondary pump means in such manner that fluid at different pressures may be discharged by each said pump means.

References Cited in the file of this patent
UNITED STATES PATENTS

| | | |
|---|---|---|
| 1,200,337 | Fraser | Oct. 3, 1916 |
| 1,751,452 | Strietmann | Mar. 18, 1930 |
| 1,770,127 | Curioni | July 8, 1930 |
| 1,871,055 | Hasbrouck | Aug. 9, 1932 |
| 2,139,373 | McKinley | Dec. 6, 1938 |
| 2,319,934 | Korte et al. | May 25, 1943 |
| 2,415,972 | Stinson | Feb. 18, 1947 |
| 2,446,612 | Sauser et al. | Aug. 10, 1948 |
| 2,556,180 | Hamilton et al. | June 12, 1951 |